(No Model.)
C. H. MOORE.
BATH TUB.
No. 398,644. Patented Feb. 26, 1889.
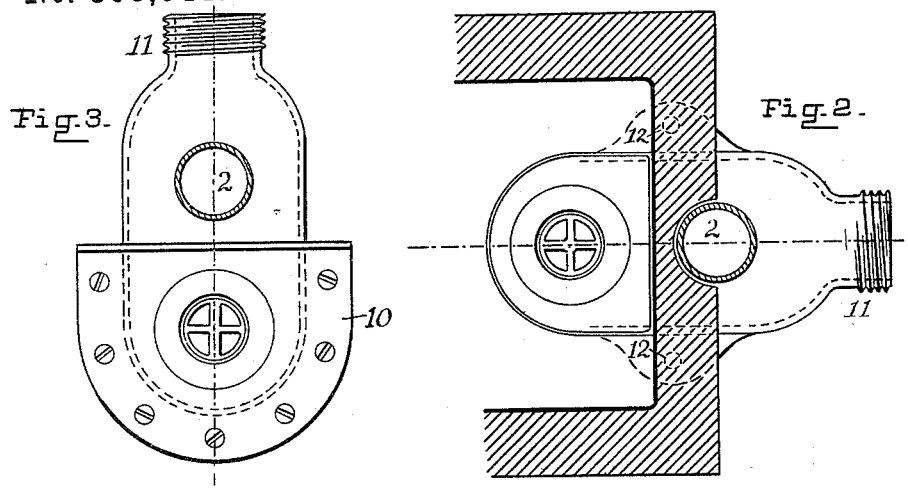
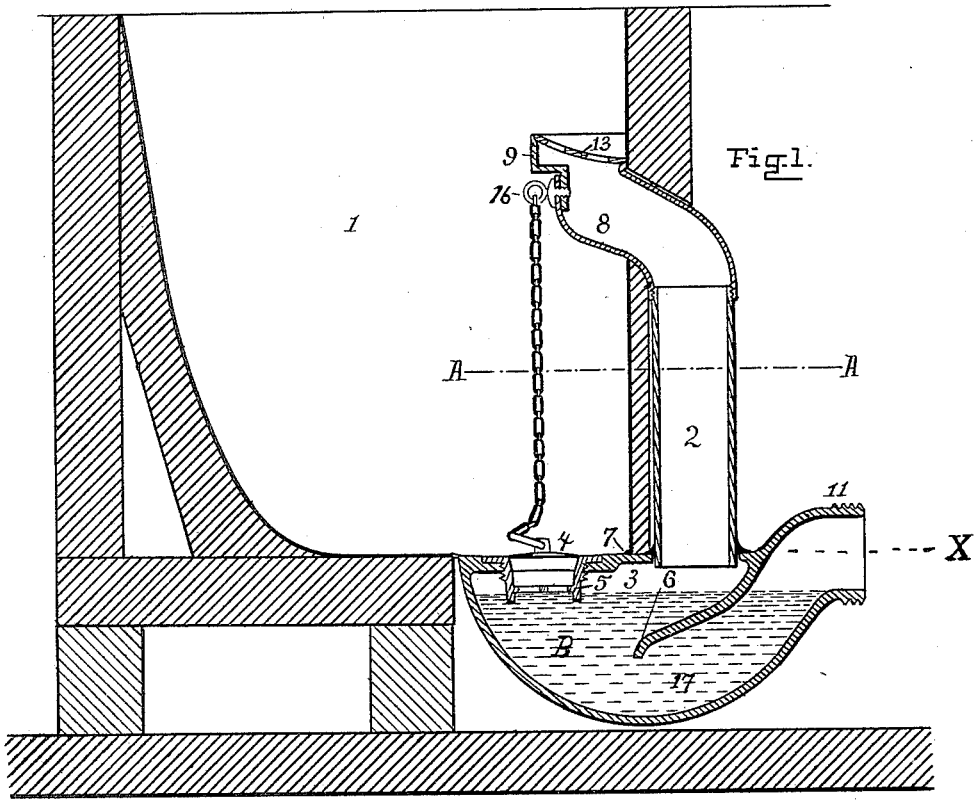
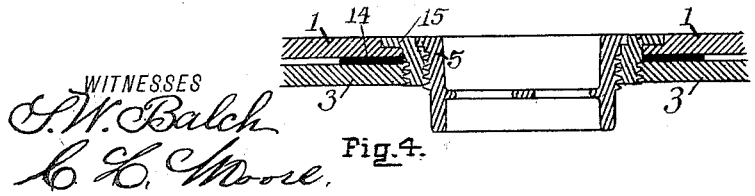
WITNESSES
S. W. Balch
C. L. Moore
INVENTOR,
C. H. Moore

UNITED STATES PATENT OFFICE.

CHARLES H. MOORE, OF YONKERS, NEW YORK.

BATH-TUB.

SPECIFICATION forming part of Letters Patent No. 398,644, dated February 26, 1889.

Application filed July 12, 1886. Serial No. 207,764. (No model.)

*To all whom it may concern:*

Be it known that I, CHARLES H. MOORE, a citizen of the United States, residing at Yonkers, in the county of Westchester and State of New York, have invented a new and useful Improvement in Bath-Tubs, of which the following is a specification.

Previous to my invention bath-tubs have been variously constructed, and traps and overflow-pipes of many different designs have been connected thereto in a variety of ways. The commonest construction and arrangement is one in which a circular opening is made in the bottom of the tub and its lining for the reception of a plug-socket and the upper end of a discharge or waste pipe, which latter is formed or provided with some sort of trap in proximity to and beneath the tub-bottom, and in which a circular opening is formed in the upper portion of one end of the tub for the introduction of one end of an overflow-pipe, whose other end extends down and connects to the waste-pipe of the trap therein; but it is also common to bring the trap underneath the tub and connect one end of it directly to the circular opening made in the bottom of the tub and the other end to the waste-pipe which runs to the sewer-connections, and in this construction it is common to extend the overflow-pipe from the opening in the end of the tub down directly to the trap.

My invention has for its main objects to improve the construction of bath-tubs and the traps used in conjunction therewith, and to so connect and arrange the parts as to simplify and cheapen the structure as an entirety and secure at the same time many important advantages; and to these ends my invention consists in the several features of construction and combinations or arrangements of parts hereinafter more fully described, and particularly pointed out in the appended claims.

In the accompanying drawings, forming a part of this specification, Figure 1 is a vertical central section of a bath-tub and trap involving my invention. Fig. 2 is a horizontal section taken at the line A A, Fig. 1. Fig. 3 shows in plan and section a modification of my invention, in which the trap is represented as bolted to the bottom of an earthenware tub. Fig. 4 shows in vertical central section a trap secured to an iron tub.

In the several views the same part will be found designated by the same numeral of reference.

1 designates the bath-tub; 2, the overflow-pipe; 3, the top plate or upper surface of the trap; 4, the plug or stopper; 5, a combined plug-socket and trap-screw; 6, the partition of the trap; 7, the solder joint connecting the trap to the lining; 8, a bent portion of the overflow-pipe; 9, the front of the strainer; 10, a flange cast on the trap; 11, the outgo or discharge end of the trap; 12, lugs for supporting the trap; 13, a strainer at the upper end of the overflow-pipe; 14, a gasket; 15, a screw-coupling; 16, a chain holder or support, and 17 the bowl of the trap.

The bowl of the trap is constructed to contain water, as usual, and its outgo or discharge end is preferably made cylindrical for connection with the customary waste-pipe. From the outgo to the opposite curved extremity the trap-top is made flat, for a purpose that will presently appear.

The bottom of the bath-tub is formed with a U-shaped opening or cut-out for the reception of a portion of the flat top plate of the trap, and in the construction shown in Fig. 1 the lining of the bottom of the tub is formed with a similar coincident opening.

In connecting the metallic trap to the tub its upper portion is introduced into the U-shaped opening in the tub's bottom until its top plate comes about flush with the internal bottom of the tub and fills said opening, as illustrated. The trap is then secured in place by soldering it to the metal lining of the tub, and its top flat surface becomes a section or portion of the tub's bottom and serves to strengthen the same. In the top plate of trap thus forming a section of the tub-bottom an aperture is made for the escape of water from the tub, and this aperture is threaded to receive the combined plug-socket and trap-screw 5.

The flat top plate of the trap preferably extends beyond the end of the tub, as shown, and is formed with an opening for the accommodation of the lower end of the overflow-pipe 2, which is formed with a bend, 8, at its upper portion, that extends into the tub.

The end wall of the tub is formed with a semicircular longitudinal groove, into which about one-half of the overflow-pipe is fitted.

The strainer or cover 13 is provided with a neck or extension which passes into the upper open bent end of the overflow-pipe, and is held in place by a screw-bolt, 16, which passes through a perforation in the front of the overflow-pipe and engages with a threaded hole in the neck or extension. To the bolt 16 is attached one end of a chain, the other end of which is connected with the stopper or plug 4.

The end wall of the tub extends down to the top of the trap, and the lining thereof is soldered to the lining of the bottom of the tub and to the trap and assists in supporting the latter.

By bringing the top of the trap up into the tub and making it form a portion of the bottom of the tub I am enabled to use a device which serves as a plug-socket and a trap-screw instead of providing separate devices, as heretofore. In the previous constructions of bath-tubs the plug-sockets were always made immovable and the trap-screws located beneath the floor of the tub.

By combining in one the plug-socket and trap-screw the device may be readily removed from the trap when it is desired to clean the latter by simply unscrewing it from the inside of the tub. Heretofore, in order to clean the trap when connected beneath the tub, it has been necessary to remove the wooden casing of the tub to remove the trap-screw. Another important advantage in having the trap-screw removable from the inside of the tub is that the filth and water of the trap cannot escape onto the floor of the room or run down on the ceiling of the floor below, as it can in those constructions where the trap-screw is located outside of the tub and below the water-line of the trap.

The lower end of the combined plug-socket and trap-screw preferably extends down into the standing water of the trap to prevent any circulation of foul air through the overflow-pipe when the plug 4 is out of the socket.

By grooving the end wall of the tub, as shown and described, the overflow-pipe can be brought nearer the inside of the tub, so that a swab may be readily inserted to clean its interior; and by this construction and arrangement I am enabled to make the trap shorter and of less weight, besides economizing in space at the end of the tub.

The trap is prevented from being forced up into the tub by means of lugs or ears 12, cast on the trap and secured to the under side of the tub. These lugs or ears also assist in supporting the trap.

At Fig. 3 the trap is shown provided with a flange, 10, by which, through the medium of screws or bolts, the trap may be secured to an earthenware tub.

At Fig. 4 a construction is shown in which the trap and the combined plug-socket and trap-screw are adapted for use in connection with an iron tub, a coupling, 15, threaded interiorly and exteriorly, being used for the purpose. Preferably a gasket is introduced between the tub and the trap.

What I claim as my invention, and desire to secure by Letters Patent, is—

1. The combination of a trap having a flat top with a bath-tub bottom having a U-shaped opening and a metal lining having a similar opening, the said trap being soldered to the said lining and so supported thereby that its flat top fills said U-shaped opening flush with the bottom of the tub and forms a section or portion of said bottom, as set forth.

2. The combination of a trap having a flat top provided with a threaded opening and a threaded plug-socket, with a bath-tub bottom having a U-shaped opening and a metal lining having a similar opening, the said trap being soldered to and supported by said lining, so that its flat top fills said opening and forms a section or portion of the said tub-bottom, and the said plug-socket being removable from the inside of the tub (for the purpose of cleaning the interior of the trap) without interfering with or disconnecting the trap, as set forth.

C. H. MOORE.

Witnesses:
CHARLES GUNNOR,
H. HENDRICKSON.